Jan. 20, 1953  L. G. DANIELS  2,626,123
VALVE STRUCTURE
Filed Nov. 10, 1945  4 Sheets-Sheet 1
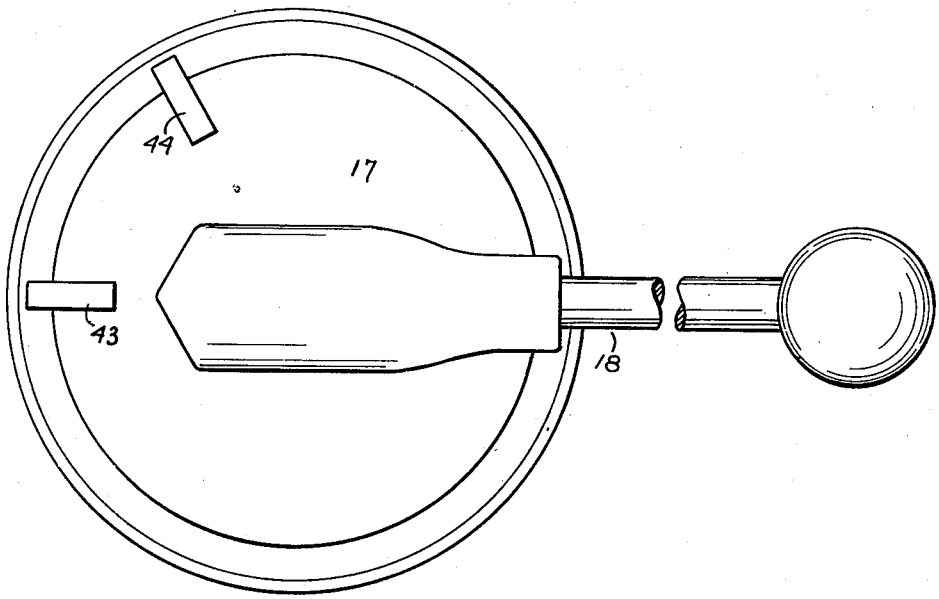
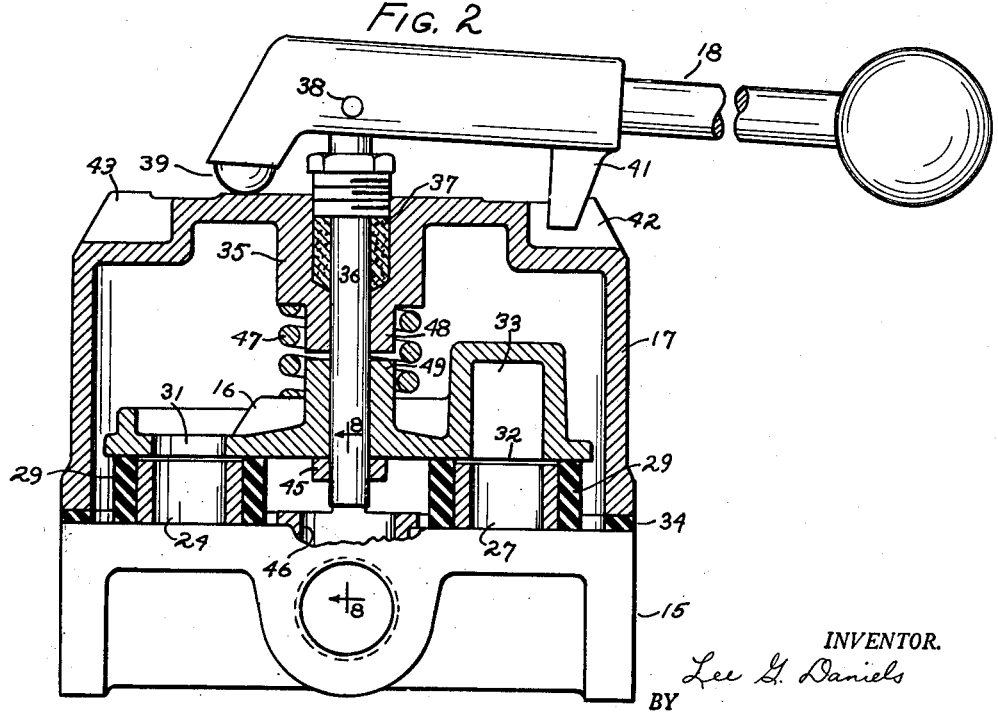
INVENTOR.
Lee G. Daniels
BY
McCanna and Morsbach

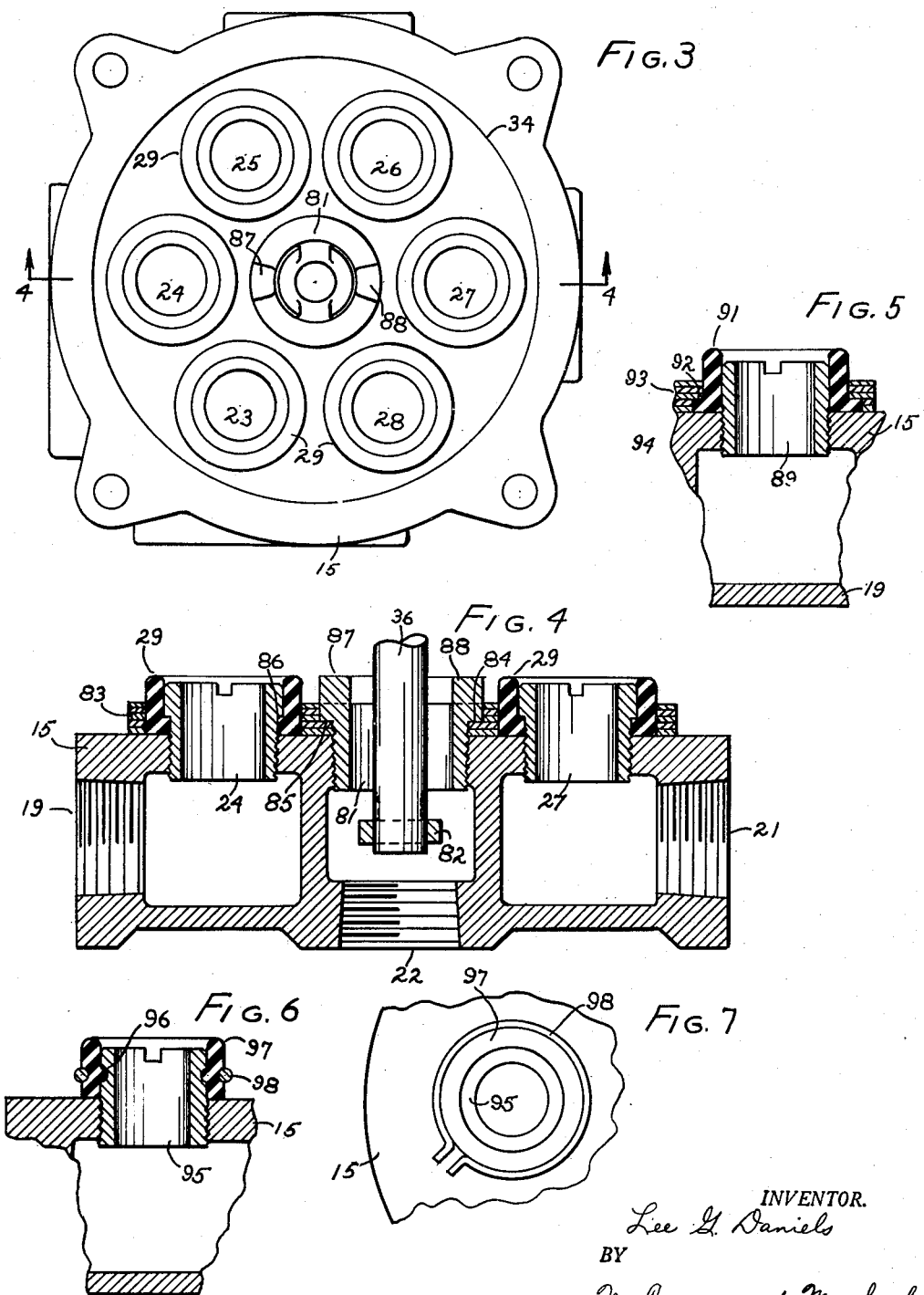

Jan. 20, 1953 L. G. DANIELS 2,626,123
VALVE STRUCTURE
Filed Nov. 10, 1945 4 Sheets-Sheet 3
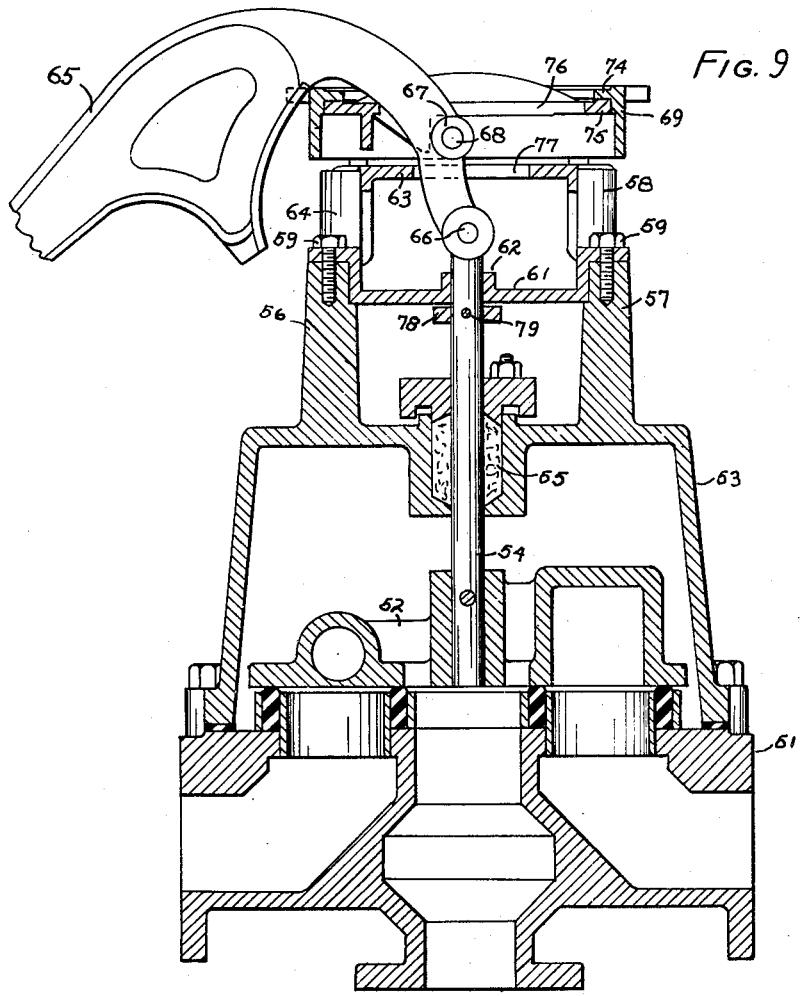
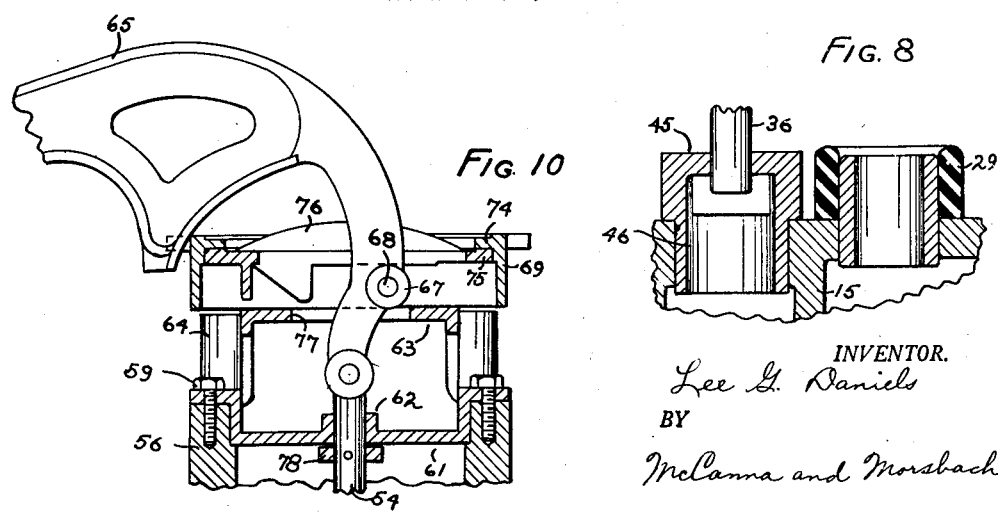
INVENTOR.
Lee G. Daniels
BY
McCanna and Morsbach Jan. 20, 1953 L. G. DANIELS 2,626,123
VALVE STRUCTURE
Filed Nov. 10, 1945 4 Sheets-Sheet 4
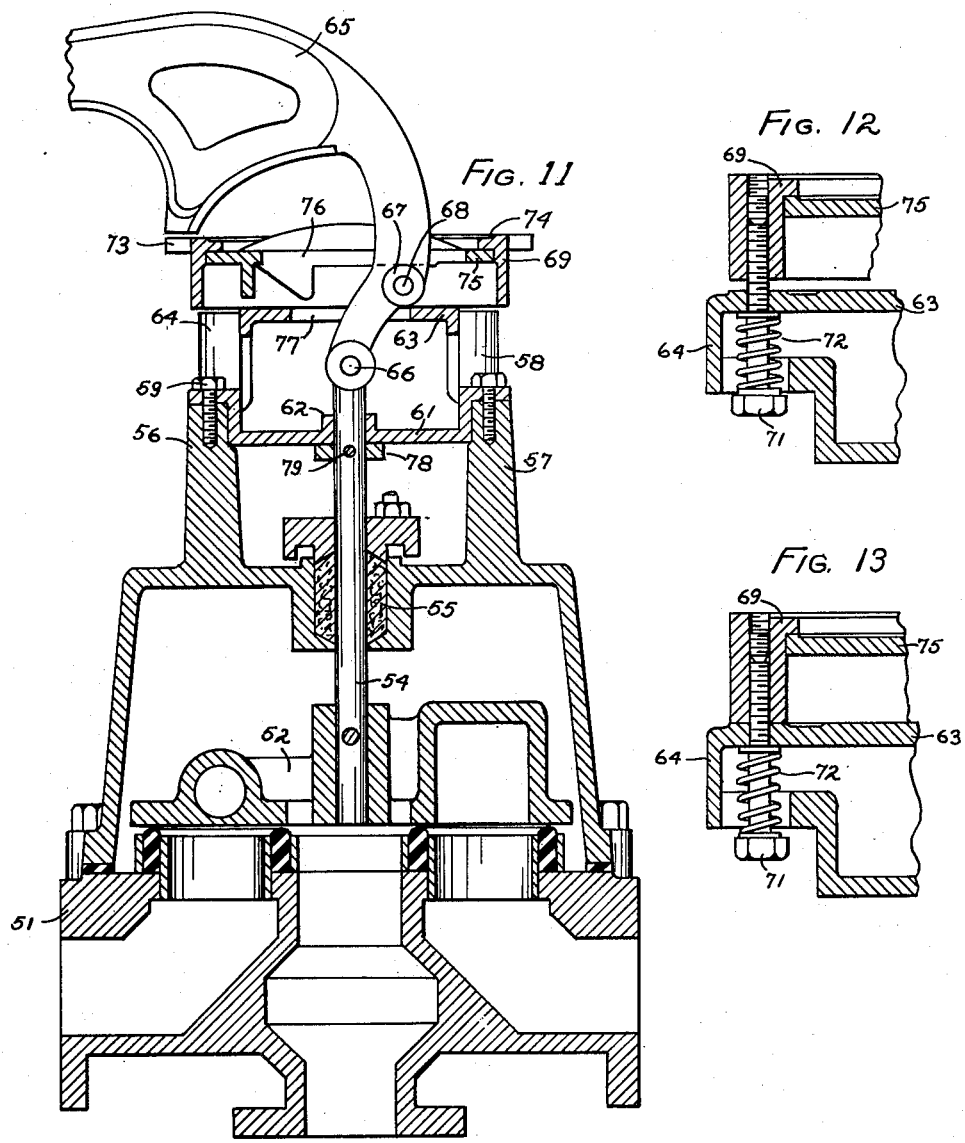
INVENTOR.
Lee G. Daniels
BY
McCanna and Morsbach Patented Jan. 20, 1953

2,626,123

UNITED STATES PATENT OFFICE 2,626,123

VALVE STRUCTURE

Lee G. Daniels, Rockford, Ill.

Application November 10, 1945, Serial No. 627,926

15 Claims. (Cl. 251—90)

This invention pertains to valves of the lift-turn multiport plate type comprising a stator member and a rotor member having confronting faces, the rotor being movable toward and from, and rotatable relatively to, the stator.

Valves of this character, while suitable for use in various places where control of a plurality of fluid flows is required, are particularly adapted for use in water treatment systems, such as water filters or zeolite water softening systems. An inherent characteristic of valves of this type is that the rotor is lifted or retracted from a seating relation with the stator prior to its turning or indexing movement to align the desired ports. Such withdrawal produces an open space between the face of the rotor and stator ports into which the raw water flows from the water supply and from which it will flow through any communicating port, such, for instance, as the drain or waste port.

A purpose of my present invention is to minimize such undesirable fluid flow which results in wastage of water, in flowing to drain, or the flow of such water where it is not desired through any other port communicating with the space between the rotor and stator ports. This is attained by my present invention through the provision of means for limiting the extent of lifting or retraction of the rotor from the stator, thereby restricting the water flow through the valve when the rotor is off its seat and minimizing the water hammer which frequently occurs in valves of this type when they are being reseated.

Another purpose of my invention is to provide a positive stop for limiting the movement of the rotor towards the stator, so that the sealing pressure on the resilient rubber sealing rings or gaskets is limited.

Another purpose of my invention is to provide improved means for mounting and retaining in position the port sealing gaskets with which the stator of such valves is equipped.

A further purpose is to provide improved means for guiding the stem of the rotor during its reciprocatory and rotary movements, as well as during the periods in which the valve is closed.

Other objects and inherent advantages of my invention should be readily appreciated as the same becomes better understood by reference to the following description when considered in connection with the accompanying drawings.

Referring to the drawings,

Fig. 1 is a plan view of a valve embodying my invention;

Fig. 2 is a vertical sectional view on a median line of the valve shown in Fig. 1;

Fig. 3 is a face view of a stator which may be used in a valve of the type shown in Figs. 1 and 2, having one arrangement for mounting and retaining port sealing gaskets on the stator, in accordance with the present invention;

Fig. 4 is a sectional view on the line 4—4 of Fig. 3;

Fig. 5 is a fragmental sectional view showing a modified structure for mounting and retaining a port sealing gasket;

Fig. 6 is a view similar to Fig. 5 of another modification of the gasket retaining means;

Fig. 7 is a plan view of the structure shown in Fig. 6;

Fig. 8 is a fragmentary sectional view of the stator of the valves of Figs. 1 and 2, taken substantially on the line 8—8 of Fig. 2;

Fig. 9 is a vertical sectional view through a modified form of valve illustrating another type of stop for limiting the lifting or retraction of the rotor from the stator;

Fig. 10 is a fragmentary view similar to Fig. 9 showing the rotor lifting mechanism at an intermediate position;

Fig. 11 is a view similar to Fig. 9, but showing the rotor in retracted or open valve position;

Fig. 12 is a fragmental sectional view showing one of the springs for depressing the index ring plate, which in this figure is disposed in the position illustrated in Fig. 11; and Fig. 13 is a similar view with the index ring plate shown in the position illustrated in Fig. 11.

Referring to the drawings more in detail and particularly to Figs. 1 and 2 thereof, it will be observed that the valve comprises generally a stator or body 15, a rotor or stem plate 16, a cap or bonnet 17 enclosing the rotor, and an operating device in the form of a handle 18 by which the rotor is lifted from the stator and turned or indexed to predetermined positions for producing the desired fluid flows.

The stator of the valve of Figs. 1 and 2, as well as the stator of Figs. 3 and 4, has a port arrangement including a plurality of radially disposed tapped openings exemplified by 19 and 21 (Fig. 4) for connection to pipes or conduits to which the various fluid flows are directed. A similar centrally disposed opening or inlet 22 affords communication for the fluid pressure supply into the cap, which in a water softener valve is the raw water supply for the system. Each of these tapped openings communicates with a chamber in the stator and from each chamber there is provided an upwardly opening port, there being in the present instance six of such ports designated by reference characters 23 to 28, inclusive, as will be apparent from Fig. 3. Each port is equipped with a gasket or sealing ring 29 of rubber or other suitable compressible and resilient material adapted to be engaged by the confronting face of the rotor to provide, when the rotor is seated against the sealing rings, a leak-proof seal around each port.

The rotor 16, which is of a plate type, is provided with ports 31, 32 and others not shown, arranged in a preselected pattern for registering with the ports in the stator and the rotor is also provided with a passage 33 connecting two or more of said ports for establishing communication therebetween.

The rotor is enclosed by the cap or bonnet 17 bolted to the stator with an interposed gasket 34 to insure against leakage, the bonnet being provided with a depending hollow boss 35 (Fig. 2) adapted to form a bearing for the rotor stem 36 upon which the rotor or stem plate is fixedly mounted. Leakage from the chamber beneath the bonnet along the stem is prevented by a packing gland 37, and the upper end of the stem is pivotally connected at 38 with the handle 18 by means of which the stem is moved longitudinally to lift or elevate and lowered to reseat the rotor in preselected positions in relation to the stator, and is turned or rotated to index the rotor. A toe part 39 on the depending end of the handle is adapted to ride upon the upper surface of the cap or bonnet during indexing movements of the valve, and a depending locking lug 41 proportioned to engage in any selected one of the notches or recesses 42, 43 or 44 serves to lock the valve in the selected position to which it has been indexed.

The lower end of the stem 36 of the valve of Figs. 1 and 2 is guided in a bearing (Figs. 2 and 3) formed in an upstanding arch 45 carried by a ferrule or bushing 46 which is threaded into the stator and forms the inlet port into the bonnet chamber for the raw water or other fluid entering the valve. The arch 45 at its upper face defines a stop to limit the seating movement of the rotor and therefore to limit the pressure between the rotor and the gaskets. The rotor is urged or pressed to a seated position illustrated in Fig. 2 by a coiled expansion spring 47 interposed between the bonnet boss 35 and the upper face of the central portion of the rotor. When a change in fluid flows is to be made the handle 18 is lifted to raise the stem 36, thereby lifting the rotor from a seated position against the sealing rings 29 in which position it was retained by the spring 47.

Since the raw water enters the bonnet chamber through the central inlet port 22 in the stator beneath the rotor, it will be apparent that when the rotor is lifted from its closed or seated position, the raw water will flow through the space between the face of the rotor and stator ports into any port through which it may escape. Such flow, as previously stated, is undesirable not only from a water wastage standpoint, but also because water hammer may be produced when the valve is reseated or closed. To eliminate such water hammer and to minimize such flow, I have provided means for restricting the extent of lifting or retraction of the rotor face from engagement with the sealing gaskets. In the form of the invention exemplified in Fig. 2 this means comprises a stop formed by a downward extension 48 of the bonnet boss 35 and an upward extension 49 of the hub of the rotor, so that these extensions provide opposed abutments or stop surfaces which positively limit the upward movement of the rotor and permit it to just clear the seating gaskets, thereby minimizing the fluid flow between the seating surfaces of the gaskets and the confronting face of the rotor.

The foregoing feature of my invention by which water hammer is prevented and loss and improper distribution of water are minimized is also applicable to lift-turn valves having a different type of lever and spring arrangement for lifting and reseating the rotor. The application of my invention to another type of valve operating means is illustrated in Figs. 9 to 13, inclusive, of the drawings. Referring now to these figures, reference character 51 designates generally the stator, 52 the rotor, and 53 the bonnet or cap of the valve. The rotor is carried on the stem 54 which extends through the packing gland 55 by which leakage along the stem is prevented. The bonnet or cap has upstanding lugs 56 and 57 which carry a spring retainer and stem guide plate, designated generally by reference character 58, secured by screws 59. The retainer and guide includes the stem guide 61 equipped with a guide boss 62 for the stem 54. The plate also carries a platform 63 (Figs. 12 and 13) and a plurality of spring casings 64 hereinafter more fully described. A handle 65 is arranged to receive the upper end of stem 54, which is pivotally connected thereto by a pin 66.

A pair of rollers 67 are carried on opposite sides of the handle upon pintles or bosses 68. When the rotor is seated, as shown in Fig. 9, the rollers will be elevated above the platform 63, but will be brought into contact therewith as the position illustrated in Fig. 10 is approached. Continued movement of the handle into the position shown in Fig. 11 causes the rollers to move along the platform 63, thereby lifting the stem 54 and retracting or lifting the rotor from the stator.

The rotor is urged or pressed into closed or seated position by an index ring 69 disposed above the platform 63 and connected thereto by bolts 71 (Figs. 12 and 13) carrying expansion springs 72 disposed in the casings 64, so that the index ring is urged downwardly toward or into the position shown in Fig. 13.

A plurality of slots or notches 73 disposed in selected spaced relation about the ring 69 serve to lock the handle 61 in selected position when said handle has been rotated to such position and lowered into the position shown in Fig. 9 to seat the rotor.

An internal plate or flange 74 on the index ring 69 overlies a plate 75 slotted at 76 to accommodate the handle end, as is also the platform 63 at 77. When the handle 65 is moved from the position shown in Fig. 10 to that shown in Fig. 11, the rollers 67 ride upon the platform 63 and raise the rotor. When the handle is disengaged from the notch or slot in the index ring, it may be turned to index the rotor to establish different combinations of fluid flows through the ports. When the handle is moved from the position of Fig. 10 to that of Fig. 9, the rollers are lifted into contact with the index spring plate 75, which is lifted against the tension of springs 72 and maintains a pressure of the rotor against the stator.

For the purpose of limiting the lifting or retraction of the rotor away from the stator, thereby restricting the water flow between the rotor face and stator ports when the valve is unseated and minimizing the water loss and water hammer, I have provided limiting abutments for a valve of the type now being described which perform the same function as the abutments 48 and 49 in the embodiment disclosed in Fig. 2. The cooperative abutments in the present instance comprise the guide plate 61 and an abutment collar 78 carried by the stem 54. The collar is in this instance illustrated as being secured on the stem by a pin 79, although, if provision for adjustment be desirable, my invention contemplates mounting the collar by threading it onto the stem and holding it with a lock nut or other means in adjusted position. The collar, when the rotor is seated, is spaced from the guide plate 61, as illustrated in Fig. 9, but when the rotor is unseated by moving the handle into the position shown in Fig. 11, the extent of retraction of the rotor away from the sealing rings or gaskets of the stator is limited by engagement of the collar with the plate 61, as illustrated in this figure.

As explained in connection with Figs. 2 and 3, the lower end of the rotor stem 36 of the valve of Figs. 1 and 2 in that instance has a bearing in an arch 45 extending upwardly from the ferrule 46 of the valve inlet port. A modification of that structure is disclosed in Fig. 4 of the drawings, where the ferrule 81 threaded into the center inlet port carries a depending arch 82 which serves as a guide for the lower end of the stem 36. In addition to carrying the stem guide, the ferrule 81 in this instance serves as a retainer to hold the plate 83, formed of metal, plastic or other suitable material, in position upon the upper face of the stator 15. This plate is apertured to accommodate the various sealing gaskets 29 and the ferrule 81, and is provided around the ferrule 81 with a shoulder 84 adapted to cooperate with opposed shoulder 85 on the ferrule, whereby the plate is locked against displacement.

The supporting plate 83 in turn, in the form shown in Fig. 4 serves to hold the gaskets 29 against expansion by a supporting wall around each of the sealing rings or gaskets and serves to prevent disconnection from the shouldered ferrules threaded or pressed into the ports 23 to 28, inclusive, and overlying internal shoulders 86 of such gaskets. The ferrule 81 also performs the additional function of limiting the approach of the rotor to the stator, so that no more than the desirable compression of the gaskets 29 will be effected by the seating effort of the spring 47. With this end in view, ferrule 81 is provided with oppositely disposed upstanding shoulders 87 and 88 having flat faces to serve as positive stops for limiting the movement of the rotor towards the stator and provide a definite compression of the sealing rings.

In the structure shown in Fig. 5, the ferrule 89 is devoid of any circumferential shoulder, but the gasket ring 91, instead of having an internal shoulder, as had the gaskets 29, Fig. 4, has an external shoulder 92, and the plate 93, corresponding to plate 83 of Fig. 4, has a companion shoulder 94 which overlies shoulder 92 whereby the gasket ring is retained in position.

A further manner of retaining the gasket rings in position is illustrated in Figs. 6 and 7, from which it will be observed that a ferrule 95 threaded or pressed into the ports of the stator is provided with a circumferential groove or recess 96 into which the compressible material of the gasket ring 97 may be forced by a spring compressing ring 98 surrounding the gasket and designed to be contracted by the spring tension thereby locking the gasket ring against displacement.

It should be apparent from the foregoing that I have provided in a valve of the multiport lift-turn type, means for limiting the lifting or retraction of the rotor from the stator to reduce the water loss and preclude the water hammer, have provided a positive stop or stops for limiting the movement of the rotor towards the stator to provide a constant sealing pressure between the faces of the sealing rings and the face of the rotor when the rotor is in the seating position, which with the stops for limiting the movement when the rotor is lifted provides positive stops when the rotor is lifted and reseated, have provided a novel guide for the lower end of the rotor stem, and have provided improved means for retaining the port sealing rings or gaskets against displacement from normal position. It should also be apparent that the structural details of my invention illustrated and described may be varied within considerable limits without exceeding the scope of my invention as defined in the following claims.

I claim:

1. A lift-turn valve, comprising a multiple port stator, a multiple port rotor, the stator and rotor having faces arranged in confronting relation, the stator having resilient sealing rings around its ports, a supporting plate having a supporting wall around each of the sealing rings, a cover attached to the stator inclosing the rotor, a stem extending from the rotor through the cover, a lever attached to the stem and arranged for lifting and turning the rotor to preselected positions relative to the stator, a spring urging the rotor towards the stator, a positive stop carried by the cover to limit the movement of the rotor from the stator a distance equal to but not substantially greater than the distance moved by the rotor in compressing the sealing rings, to restrict to a minimum the flow of water transversely between the rings and the rotor while the latter is unseated, and a central bushing attached to the stator, said bushing having a positive stop surface for limiting the movement of the rotor towards the stator to limit the compression of the sealing rings.

2. A lift-turn valve, comprising a multiple port stator member, a multiple port rotor member, the members having faces arranged in confronting relation, one of the members having resilient sealing rings around its ports arranged to be compressed by the other member, a cover attached to the stator inclosing the rotor, a fluid pressure inlet communicating with the inside of the cover, a stem extending from the rotor through the cover, a lever attached to the stem arranged for lifting and turning the rotor to preselected positions relative to the stator, a spring urging the rotor towards the stator, a positive stop carried by the cover to limit the lifting movement of the rotor away from the stator a distance equal to but not materially greater than the distance moved by the rotor in compressing the sealing rings, to restrict to a minimum the flow of water transversely between the rings and the rotor while the latter is unseated and thereby reduce the fluid waste when the rotor is in unseated relation with the stator, and a positive stop carried by the stator to limit the movement of the rotor towards the stator to limit the compressing of the sealing rings.

3. A rotary valve, comprising a multiported stator, a multiported rotor, a ferrule secured in each of the stator ports, a compressible resilient ring surrounding each of said ferrules, said rings and ferrules being provided with opposed abutting shoulders whereby the rings are retained against axial displacement, and a supporting plate mounted on the stator provided with openings shaped and dimensioned to snugly receive said rings to confine the rings between the plate and the ferrules in the region of said shoulders and thereby retain said shoulders in abutting relation.

4. A valve, comprising a stator provided with a plurality of ports, a rotor having ports cooperable with the stator ports, a ferrule member mounted in each of the ports of the stator, a resilient compressible sealing ring member surrounding each of said ferrule members, and a supporting plate member mounted on the stator having openings shaped and dimensioned to snugly receive said ring members to confine the ring members between the ferrule members and the plate member, said ring members being provided with shoulders arranged to abut with companion shoulders on one of the other members, to prevent movement of the ring members longitudinally of the ferrule members.

5. A valve, comprising a ported stator, a ferrule member mounted in a stator port, a gasket ring surrounding the ferrule and seated against the stator, and a holding plate member surrounding the gasket ring and attached to the stator, said gasket ring being provided with an annular shoulder in spaced relation to the stator, an opposed shoulder on one of said members spaced from the stator a distance to overlie the shoulder on the ring, the holding plate snugly receiving the ring in the region of said shoulders to confine the ring between the plate and the ferrule and thereby prevent lateral displacement of the shoulder on the ring, whereby through the joint action of said plate and ferrule said ring is retained in position.

6. A rotary valve comprising a multiported stator, a multiported rotor having ports cooperable with the stator ports, ferrules secured in the stator ports each having an annular recess on the exterior thereof, resilient compressible sealing rings surrounding said ferrules each having a portion disposed in the annular recess of the corresponding ferrule to retain the rings against axial displacement, and a compression ring surrounding each of the sealing rings annular thereof to compress the sealing rings against the ferrules and to retain the aforesaid portion of the rings in the annular recesses of the ferrules.

7. A valve comprising a stator provided with a plurality of ports, a rotor having ports cooperable with the stator ports, ferrules secured in the ports of the stator, each of the ferrules having an annular groove on the outer surface thereof, resilient compressible sealing rings surrounding said ferrules each having a portion disposed in the annular groove in the corresponding ferrule to retain the rings against axial displacement, and a compression ring surrounding each of the sealing rings annularly thereof to compress the sealing rings against the ferrules and retain the material of the sealing rings at the aforesaid portion thereof in the annular grooves of the ferrules to hold the sealing rings against displacement.

8. A rotary valve comprising a multiported stator, a multiported rotor, ferrules secured in the stator ports each having an annular recess on the exterior thereof, compressible resilient rings surrounding said ferrules each having a portion disposed in the annular recess of the corresponding ferrule to retain the rings against axial displacement, and means disposed on the exterior of the rings annularly thereof for retaining the aforesaid portion of the rings in the annular recesses of the ferrules.

9. A multiport lift-turn valve comprising a stator having a central port and a plurality of annular ports, a ported plate type rotor disposed above the stator and mounted to be lifted, turned and reseated into cooperative relation with the stator in any of a plurality of positions, a bonnet attached to the stator and enclosing the rotor, a stem for operating said rotor, the stem extending up through said bonnet, the rotor being fixedly attached to the stem intermediate the ends thereof to provide a lower end portion of the stem projecting beyond the rotor in the direction of the stator, a bearing in the bonnet receiving said stem for reciprocatory and rotary movements, and a ferrule disposed in said central port below said bearing in the bonnet in spaced relation therefrom, said ferrule having a guide slidably receiving said stem for reciprocatory and rotary movement thereof, said stem extending down through and below said guide in the ferrule in all positions of the rotor relative to the stator so that the guide forms a reciprocatory bearing for the lower end of the stem when the rotor is unseated upwardly away from the stator.

10. A multiported lift-turn valve comprising a stator having a central port and a plurality of annular ports, a ported plate type rotor disposed above the stator and mounted to be lifted, turned and reseated in cooperative relation with the stator in any of a plurality of positions to change the flow through the valve, a bonnet on said stator enclosing the rotor, a stem for operating the rotor, said stem extending up through the bonnet and having bearing support therein, means attaching the rotor to the stem intermediate the ends of the stem to provide a lower stem portion projecting beyond the rotor in the direction of the stator, means connected with the upper end of the stem outside the bonnet for imparting longitudinal and rotary movement thereto, and a ferrule mounted in said central port, said ferrule having a guide rotatably and slidably receiving the lower end portion of the stem disposed adjacent the stator, said stem extending down through and below said guide in the ferrule in all positions of the rotor relative to the stator so that the guide forms a reciprocatory bearing for the lower end portion of the stem when the rotor is unseated upwardly away from the stator, said guide being in the form of an arch projecting from the end of the ferrule and extending transversely thereof.

11. A valve comprising a stator provided with a plurality of ports, a rotor having ports cooperable with the stator ports, a ferrule mounted in each of the ports of the stator, each of said ferrules having an annular recess, a resilient compressible sealing ring surrounding each of said ferrules, and means surrounding each of the sealing rings to confine the sealing rings against the ferrules and retain a portion of the rings within said annular recesses to prevent axial displacement of the rings.

12. A multiport lift-turn valve comprising a stator having a central inlet port and a plurality of discharge ports, a ported plate type rotor disposed above the stator and adapted to be lifted, turned and reseated into cooperative relation with the stator to selectively control the flow of fluid through the valve, a bonnet attached to the stator and enclosing the rotor, a stem attached to the rotor to control the position thereof extending through the bonnet, a ferrule located at said central inlet port in the stator interposed in the path of movement of the rotor toward the stator to define a limit stop for the seating of the rotor against the stator, said stem extending through said ferrule, and a guide carried by said ferrule slidably receiving said stem to form a bearing for reciprocatory and rotary movement thereof.

13. The valve of claim 12, wherein there is provided a bearing in the bonnet slidably supporting the stem for rotary and reciprocatory movement thereof.

14. A multiport lift-turn valve comprising a stator member having a plurality of spaced ports, a rotor and stem assembly comprising a rotor member and a stem attached to the rotor member for controlling the lifting and turning thereof, said rotor member having a plurality of ports, the stator and rotor members having faces arranged in confronting relation, one of the members having resilient sealing rings around its ports arranged to be compressed by the other member, a cover attached to the stator member enclosing the rotor member, said stem attached to the rotor member extending through said cover, and stop means including a stop carried by the cover interposed in the path of movement of the rotor and stem assembly away from the stator member operative to limit movement of the rotor member away from the stator member a distance equal to but not materially greater than the distance moved by the rotor member in compressing the sealing rings to restrict to a minimum the flow of fluid between the rotor and stator members while the rotor member is unseated.

15. A multiport lift-turn valve comprising a stator having a central port and a plurality of annular ports, a ported plate type rotor disposed above the stator and adapted to be lifted, turned and reseated into cooperative relation with the stator in any of a plurality of positions, a bonnet attached to the stator and enclosing the rotor, a stem for operating said rotor, the stem extending through said bonnet, the rotor being fixedly attached to the stem intermediate the ends thereof to provide an end portion of the stem projecting beyond the rotor in the direction of the stator, a bearing in the bonnet receiving said stem for reciprocatory and rotary movement, and a ferrule disposed in said central portion, said ferrule having a guide slidably receiving said stem for reciprocatory and rotary movement thereof, said ferrule projecting above the stator and said rotor engaging the ferrule in spaced relation to the stator to limit approach movement of the rotor toward the stator.

LEE G. DANIELS.

REFERENCES CITED

The following references are of record in the file of this patent:

UNITED STATES PATENTS

| Number | Name | Date |
|---|---|---|
| 846,644 | Brady | Mar. 12, 1907 |
| 1,120,975 | Roderick | Dec. 15, 1914 |
| 2,047,131 | Riche | July 7, 1936 |
| 2,209,992 | McGill | Aug. 6, 1940 |
| 2,209,993 | McGill | Aug. 6, 1940 |
| 2,299,802 | Daniels | Oct. 27, 1942 |
| 2,311,989 | McGill | Feb. 23, 1943 |
| 2,377,473 | Wolcott | June 5, 1943 |
| 2,451,678 | Johnson | Oct. 19, 1948 |